United States Patent [19]

Shimamori

[11] Patent Number: 5,737,202
[45] Date of Patent: Apr. 7, 1998

[54] REDUNDANT POWER SUPPLY SYSTEM

[75] Inventor: Hiroshi Shimamori, Kawasaki, Japan

[73] Assignee: Fujitsu Limited, Kawasaki, Japan

[21] Appl. No.: 498,910

[22] Filed: Jul. 6, 1995

[30] Foreign Application Priority Data

Nov. 14, 1994 [JP] Japan .................. 6-279367

[51] Int. Cl.⁶ ............................................. H02M 7/537
[52] U.S. Cl. ............................................. 363/65; 307/82
[58] Field of Search ............................ 363/65; 307/52, 307/64, 69, 82; 361/18

[56] References Cited

U.S. PATENT DOCUMENTS

| | | | |
|---|---|---|---|
| 3,538,405 | 11/1970 | Borden et al. | 307/82 |
| 4,680,689 | 7/1987 | Payne et al. | 363/26 |
| 4,685,039 | 8/1987 | Inou et al. | 363/16 |
| 5,088,017 | 2/1992 | Yaginuma et al. | 363/21 |
| 5,488,531 | 1/1996 | Aldridge et al. | 361/18 |
| 5,566,060 | 10/1996 | Shimmer | 363/65 |

*Primary Examiner*—Adolf Berhane
*Attorney, Agent, or Firm*—Nikaido, Marmelstein, Murray & Oram LLP

[57] ABSTRACT

A redundant power supply system so contrived that, upon occurrence of a fault in any one power unit, the other power unit is capable of performing relief power supply to a load. The power supply system comprises an AC-DC converter for converting an AC voltage to a DC voltage, and a plurality of power units connected in parallel to the output side of the AC-DC converter. Each of the power units includes a power source for feeding the load with a stable DC output corresponding to the DC voltage; a fuse connected to the input side of the power source for cutting off a power line; a coil connected in series to the fuse; and a capacitor connected between a line, which is disposed between the fuse and the coil, and another line between the output side of the AC-DC converter and the input side of the power source.

13 Claims, 12 Drawing Sheets

FIG.12
PRIOR ART

REDUNDANT POWER SUPPLY SYSTEM

BACKGROUND OF THE INVENTION

1. Field of the Invention

The present invention relates to a power supply system having a redundant construction with a plurality of power units.

2. Description of the Related Art

This power supply system is applicable to an apparatus such as a non-stop computer where high reliability is requisite, and it is so designed that, even when any one of power units is rendered faulty, the other power unit is capable of supplying a necessary voltage/current so as to prevent a primary stop of the power-supplied apparatus.

Figure 9:
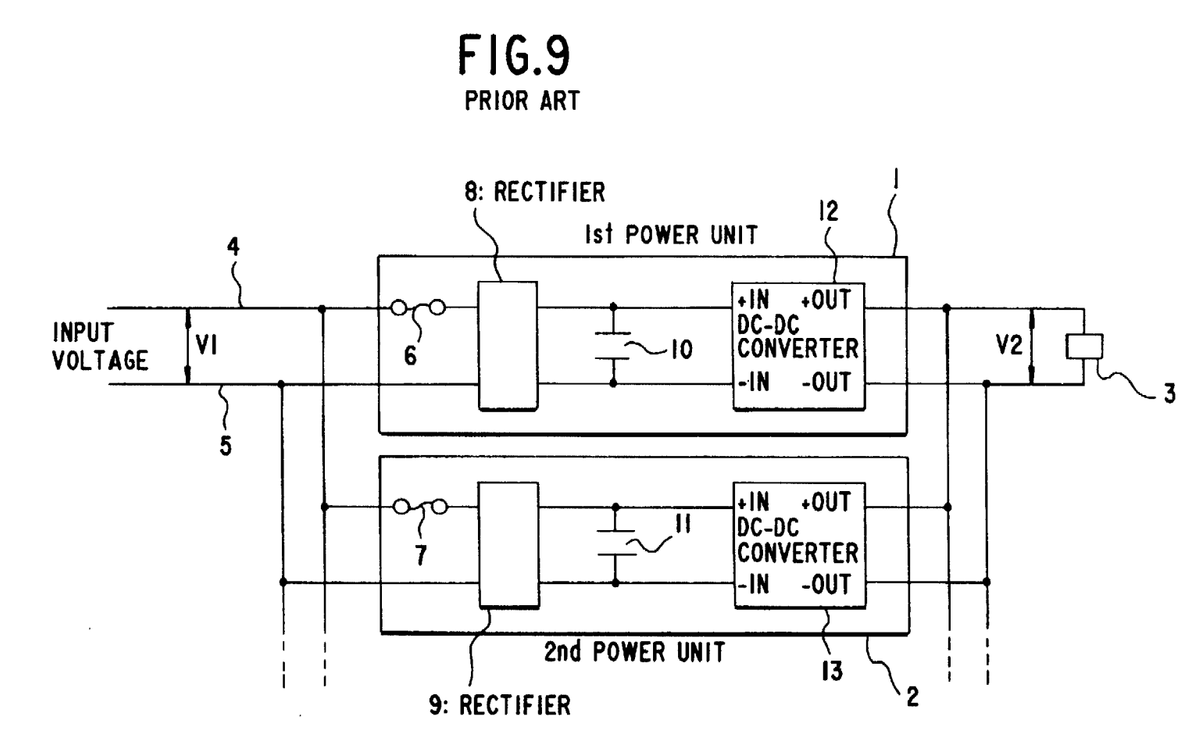
FIG. 9 is a circuit block diagram of a power supply system in a first conventional example of the prior art.

FIG. 9 is a circuit block diagram of a first conventional power supply system according to the prior art. In this diagram, there are shown a first power unit 1, a second power unit 2, and a load (power-supplied apparatus) 3. The first and second power units 1, 2 are connected in parallel to a power line 4, to which an AC input voltage V1 is supplied, and also to a grounded earth line 5, while being connected in parallel to the power units 1 and 2 becomes an input voltage V2 to the load 3. The power units 1 and 2 are structurally the same. In the power units 1 and 2, there are included fuses 6 and 7, rectifiers 8 and 9, capacitors 10 and 11, and DC-DC converters 12 and 13, respectively.

The structure of the power units 1 and 2 will now be described below by taking the first power unit 1 as a representative example. The fuse 6 is connected to the power line 4 so as to cut off the power line 4 when any excessive short-circuit current flows as a result of internal short in the power unit 1. The rectifier 8 is connected to both the power line 4 and the earth line 5, and serves to convert the input AC voltage V1 into an output DC voltage. The capacitor 10 is connected between the two lines 4 and 5 for smoothing the rectified DC voltage outputted from the rectifier 8. And the DC-DC converter 12 stabilizes the DC voltage of the capacitor 10 while insulating the input and the output thereof from each other to produce the output voltage V2 required for the load.

If two power units are employed as shown in the diagram, normally the configuration is so formed that the combined output current of the first and second power units 1 and 2 is supplied to the load 3. For example, when the load 3 has a current capacity of 100A, each of the power units 1 and 2 needs to be capable of outputting a maximum current of 100A. In this case, normally a current of, e.g., 50A is outputted from each of the power units 1 and 2, and a combined current of 100A is supplied to the load 3. And in case the first power unit 1 fails to function properly due to some reason, a current of 100A is outputted from the second power unit 2 to compensate for the failure. Although two power units are employed in this example, it is possible to use N power units in compliance with the capacity of the load 3.

Suppose now that, in the configuration mentioned above, the first power unit 1 is rendered faulty as a result of internal short-circuiting. Then a short-circuit current flows in the first power unit 1 to consequently blow out the fuse 6. However, during the time until such blow-out of the fuse 6, the input voltage V1 is sharply dropped down to approximately zero volt, whereby the input voltage to the second power unit 2 is also reduced to approximately zero volt. But the diode constituting the rectifier 9 is reverse-biased by the voltage corresponding to the electric charge stored in the capacitor 11 prior to the short-circuiting, so that the voltage anterior to the short-circuiting can be supplied from the capacitor 11 to the DC-DC converter 13.

Consequently, the required voltage V2 can be supplied from the DC-DC converter 13 to the load 3 with a current of the required capacity. In this example, it is assumed that the capacitor 11 has a sufficient capacity for supplying the required voltage to the DC-DC converter 13 during the time from occurrence of a short-circuit trouble to blow-out of the fuse 6. This condition is the same with regard to the first power unit 1 as well.

Figure 10:
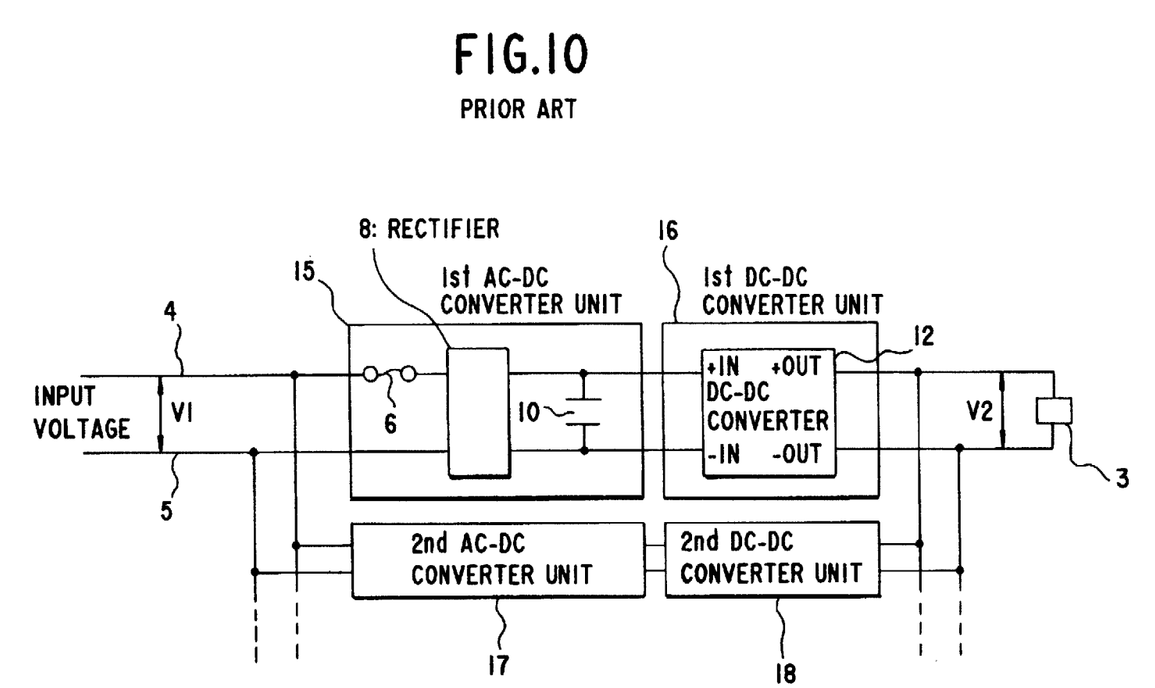
FIG. 10 is a circuit block diagram of a power supply system in a second conventional example of the prior art.
Figure 11:
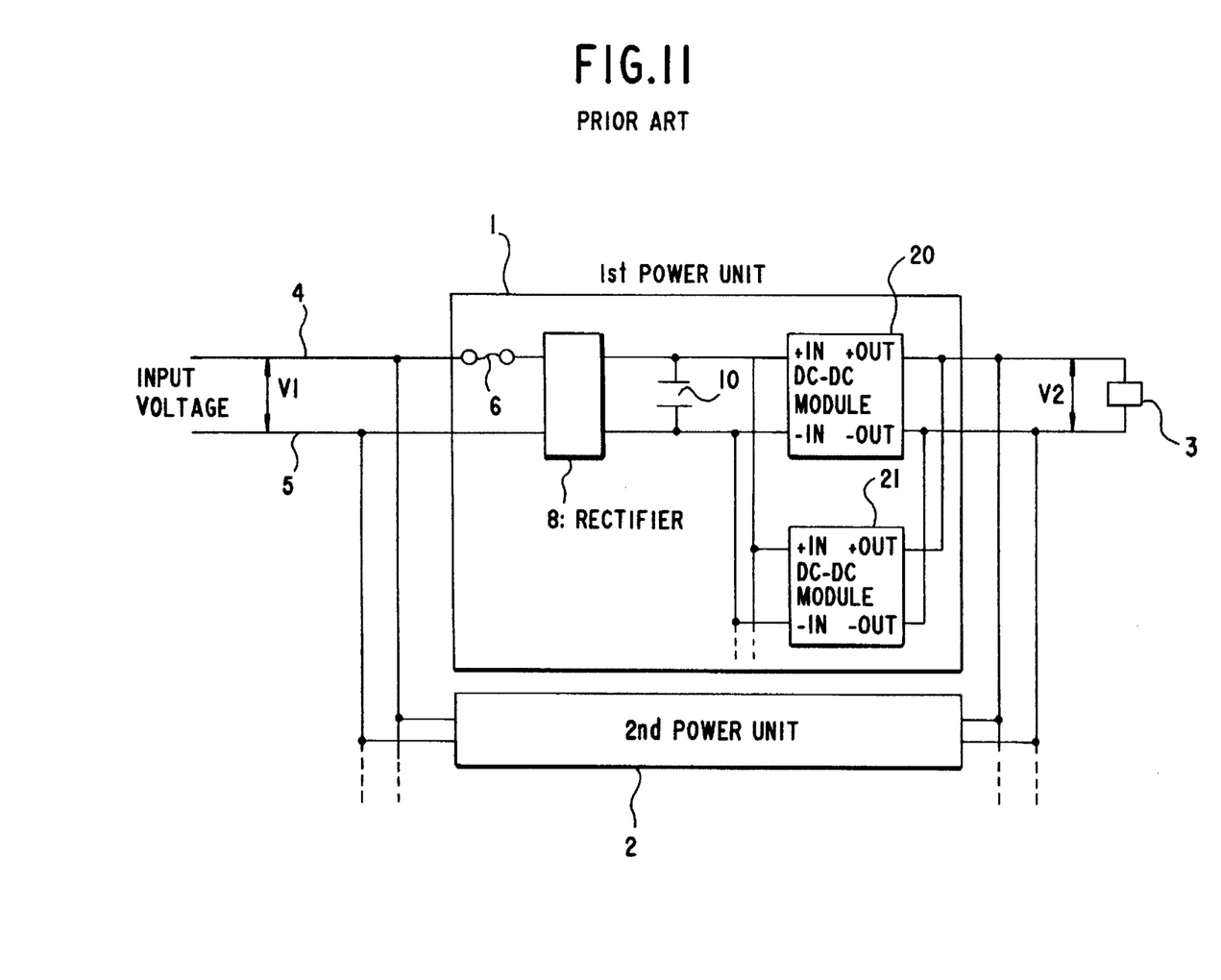
FIG. 11 is a circuit block diagram of a power supply system in a third conventional example of the prior art.

The above-described power supply system shown in FIG. 9 may be modified into a variety of other constitutions. Typical examples thereof are shown in FIGS. 10 and 11. FIG. 10 is a circuit block diagram of a second conventional power supply system according to the prior art. In FIG. 10, like system components corresponding to those used in the foregoing first conventional example of FIG. 9 are denoted by like reference numerals, and a repeated explanation thereof is omitted.

The power supply system in the second conventional example of FIG. 10 is structurally different from the first conventional example of FIG. 9 in the points that power units 1 and 2 are separated respectively into AC-DC converter units 15, 17 and DC-DC converter units 16, 18, wherein each of the DC-DC converter units 16, 18 is formed into an integrated circuit.

Integration of each of the AC-DC converter units 16 and 18 is somewhat difficult because of large dimensions of a rectifier itself, a relay (not shown) on the input side of the rectifier, and a capacitor on the output side of the rectifier. However, since the DC-DC converters can be integrated, the whole system is dimensionally reducible due to the above constitution in comparison with the foregoing conventional example of FIG. 9. The operation is the same as that of the example shown in FIG. 9.

FIG. 11 is a circuit block diagram of a power supply system in a third conventional example according to the prior art. In FIG. 11, like system components corresponding to those used in the first conventional example of FIG. 9 are denoted by like reference numerals, and a repeated explanation thereof is omitted.

The power supply system in the third conventional example of FIG. 11 is structurally different from the first conventional example of FIG. 9 in the point that the DC-DC converter in each of the power units 1 and 2 is formed into a module. More specifically, as shown in FIG. 11, DC-DC converters of a small capacity (hereinafter referred to as DC-DC modules) 20 and 21 are connected in parallel to a capacitor 10. Assuming that the DC-DC converter 12 shown in FIG. 9 has a capacity of 5V/100A for example, this converter is constituted of DC-DC modules each having a capacity of 5V/20A. In the case of such a capacity, although only two DC-DC modules are shown in FIG. 11 as denoted by reference numerals 20 and 21, five modules are practically existent therein.

If each DC-DC converter is constituted of a plurality of DC-DC modules, in case the power unit is separated as described with reference to FIG. 10 and the DC-DC converter components are integrated, a further dimensional reduction is attainable in comparison with the example of FIG. 10. The operation thereof is the same as that shown in FIG. 9.

When the system is so constituted as the conventional second and third examples shown in FIGS. 10 and 11 respectively, it is possible to further reduce the dimensions more than the first conventional example shown in FIG. 9. However, in any of the constitutions of FIGS. 9 to 11, there is a disadvantage that the whole structure is rendered large since AC-DC converters are required for each power unit individually.

Figure 12:
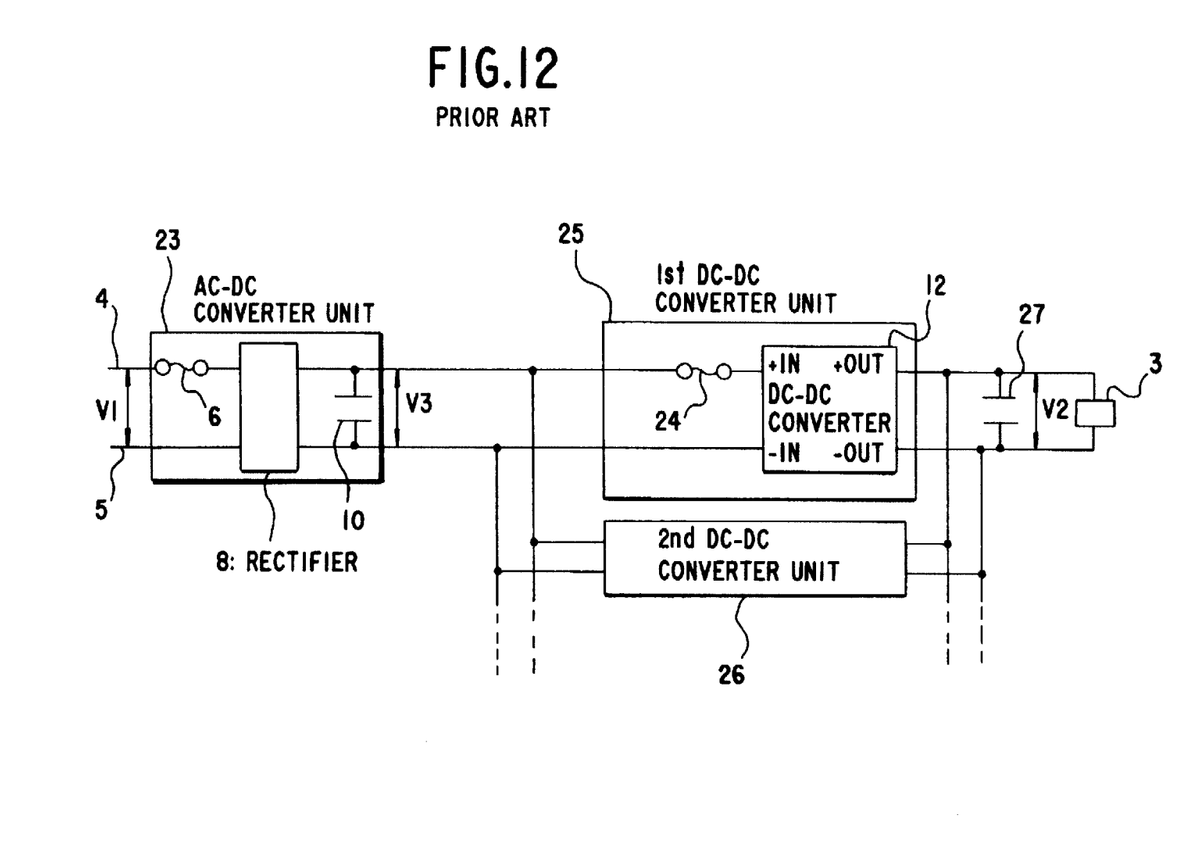
FIG. 12 is a circuit block diagram of a power supply system in a fourth conventional example of the prior art.

In view of the drawback mentioned, a fourth conventional power supply system of FIG. 12 according to the prior art is contrived to be down-sized by employing a single AC-DC converter unit 23. More specifically, in the power supply system of FIG. 12, a plurality of DC-DC converter units 25 and 26 are connected in parallel to an AC-DC converter unit 23, wherein a fuse 24 is connected to a stage anterior to a plus input terminal +IN of a DC-DC converter 12, and a capacitor 27 is connected to a load 3. In this constitution, an AC voltage V1 is converted into a DC voltage V3 by the AC-DC converter unit 23 and then is distributed to the DC-DC converter units 25 and 26. The above constitution is intended to attain high reliability substantially without any breakdown for the reason that the AC-DC converter unit 23 consists of a combination of a diode-bridge rectifier 8 and a capacitor 10. A fuse 6 provided in the anterior stage of the rectifier 8 is a type of a greater capacity than that shown in any of FIGS. 9 to 11.

When the DC-DC converter 12 of the first DC-DC converter unit 25 is short-circuited for example, the output voltage V3 of the rectifier 8 is suddenly dropped approximately to zero volt until the fuse 24 blows out due to flow of a short-circuit current. However, during such a period of time, the electric charge stored in the capacitor 27 prior to the short-circuit can be supplied therefrom to consequently maintain proper power supply to the load 3.

As described, when any one DC-DC converter (e.g., 12) is short-circuited in the conventional power supply system of FIG. 12, it is necessary to supplement, until blow-out of the fuse 24 in the anterior stage of the DC-DC converter 12, the power supply to the load 3 by the capacitor 27 disposed on the output side of the DC-DC converter 12. Since the low-voltage power supply system mentioned above is generally required to retain a high output voltage precision, a multiplicity of capacitors 27, each adapted for low-voltage use and having a small energy storage capacity per unitary volume, need to be employed for supplementing the power supply to the load 3, hence raising some problems inclusive of considerable increases of both the volume and the production cost.

Furthermore, when power units of 5V/100A for example are used in any of the power supply systems of FIGS. 9 to 12 having a redundant construction where a plurality of power units are employed so that the other power unit can supplement the required power despite a fault of one power unit, two power units need to be used even if a load current is 45A which is less than a half of the supply capacity, thereby increasing the production cost to an extremely great extent.

SUMMARY OF THE INVENTION

It is therefore an object of the present invention to provide an improved power supply system which is adapted to realize a small-sized redundant construction at low cost to perform, upon occurrence of a fault in any one power unit, relief power supply to a load by the other power unit.

In accordance with an aspect of the present invention, there is provided a power supply system for feeding a load with a DC output. The system comprises an AC-DC converter for converting an AC voltage to a DC voltage, and a plurality of power units connected in parallel to the output side of the AC-DC converter; wherein each of the power units includes a power source for feeding the load with a stable DC output corresponding to the DC voltage, an interruption means for cutting off a power line connected to the input side of the power source, a coil connected in series to the interruption means, and a capacitor connected between a line, which is disposed between interruption means and the coil, and another line between the output side of the AC-DC converter and the input side of the power source.

According to the present invention, when the power source in any one power unit is internally short-circuited, the interruption means is cut off by a discharge current released from a capacitor incorporated in that power unit. Since the power unit includes a coil, the impedance of the coil is seen as viewed from the AC-DC converter side, and the output voltage of the AC-DC converter is gradually lowered during the time from occurrence of the short-circuit trouble to the cutoff of the interruption means. Therefore the input voltage to the other power unit is maintained, and during the time from occurrence of the short-circuit trouble in one power unit to the cutoff of the interruption means, the power source of the other power unit performs a normal operation by the discharge current released from the capacitor in the other power unit, whereby the desired DC voltage to the load can be applied properly.

In accordance with another aspect of the present invention, there is provided an improved power supply system for feeding a load with a DC output. The system comprises an AC-DC converter for converting an AC voltage to a DC voltage, and a power unit connected to the AC-DC converter via a power line and a ground line; wherein the power unit includes a plurality of power circuits connected in parallel to the AC-DC converter, and a first interruption means inserted in the power line. Each power circuit comprises a unit power source for feeding the load with a stable output corresponding to the DC voltage, a second interruption means for cutting off the power line connected to the input side of the unit power source, a coil connected in series to the second interruption means, and a capacitor connected between a line, which is disposed between the second interruption means and the coil, and another line between the output side of the AC-DC converter and the input side of the unit power source.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
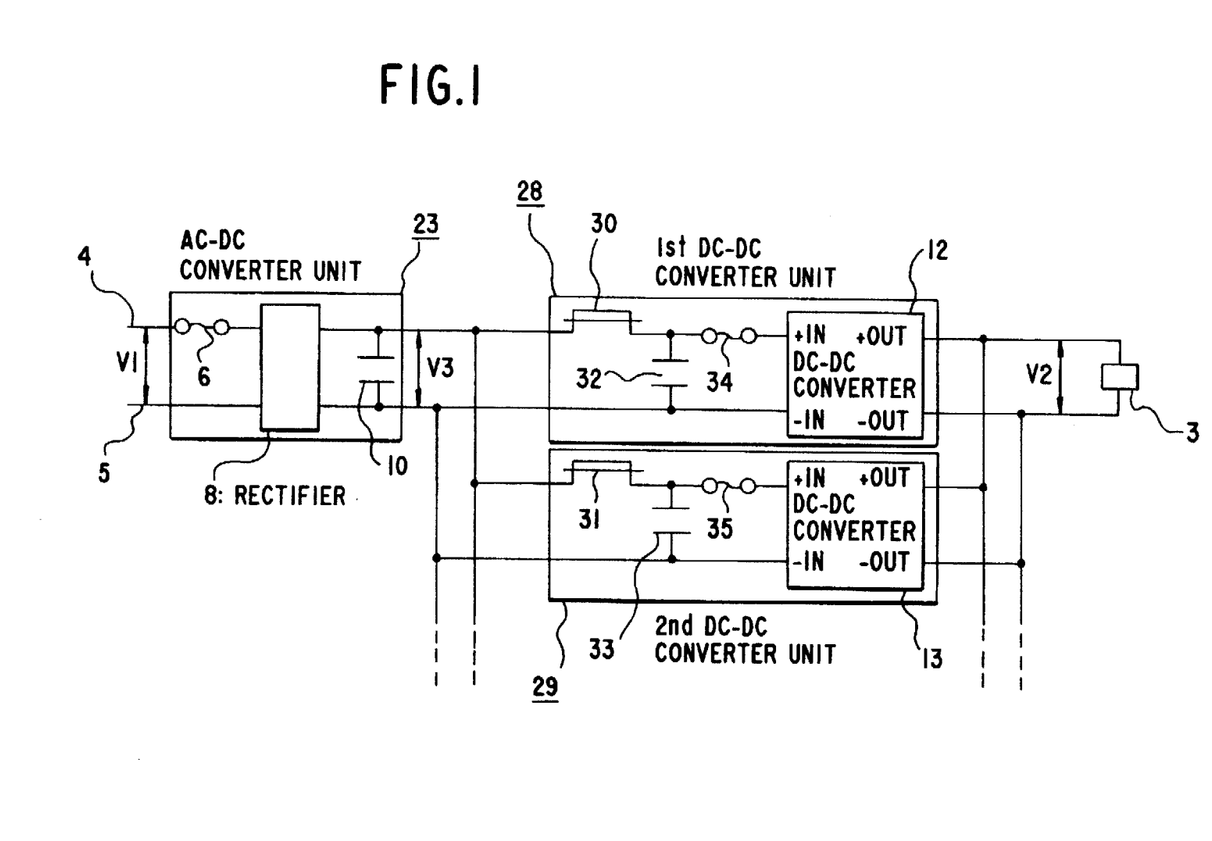
FIG. 1 is a circuit block diagram of a power supply system in a first embodiment of the present invention.

Hereinafter some preferred embodiments of the present invention will be described in detail with reference to the accompanying drawings. FIG. 1 is a circuit block diagram of a power supply system in a first embodiment of the present invention. In this diagram, like system components corresponding to those in the conventional example of FIG. 12 are denoted by like reference numerals, and a repeated explanation thereof is omitted.

The power supply system shown in FIG. 1 comprises an AC-DC converter unit 23 for converting an AC voltage V1, which is inputted via a power line 4 and an earth line 5, into a DC voltage V3; and a plurality of DC-DC converter units 28 and 29 connected to the output side of the unit 23 in such a manner that the DC voltage V3 is distributed thereto. The output sides of the first and second DC-DC converter units 28 and 29 are connected in parallel to each other in a manner that the output voltage V2 thereof is supplied to a load 3. In this configuration, the output currents of the units 28 and 29 are combined with each other and supplied to the load 3.

The AC-DC converter unit 23 includes a fuse 6, a rectifier 8 and a capacitor 10, as in the aforementioned example of FIG. 12. The DC-DC converter units 28 and 29 respectively have DC-DC converters 12, 13 and fuses 34, 35 (denoted by different reference numerals) shown in FIG. 12 and further has coils 30, 31 and capacitors 32, 33 which are characteristic elements in this embodiment.

Now the characteristic construction of the DC-DC converter units 28 and 29 will be described below by taking the first unit 28 as a representative example. The coil 30 is connected to one output side of the rectifier 8 and one input side of the converter 12 in a manner to be connected in series to the fuse 34 on the input side of the unit 28, while the capacitor 32 is connected between a line, which is disposed between the coil 30 and the fuse 34, and another line between the other output side of the rectifier 8 and the other input side of the converter 12.

When the DC-DC converter 12 for example is short-circuited in this construction, the fuse 34 is blown out by the discharge current released from the capacitor 32. Meanwhile in the construction of the conventional DC-DC converter unit 25 shown in FIG. 12, the output voltage V3 of the rectifier 8 is suddenly dropped to be approximately zero volt during the time from occurrence of such short-circuit trouble to the blow-out of the fuse 34, so that it is impossible for the second DC-DC converter unit 13 to supplement the proper power supply to the load 3.

However, in the first DC-DC converter unit 28 of FIG. 1 where the coil 30 is existent, the impedance of the coil 30 is seen as viewed from the rectifier 8, whereby the output voltage V3 of the rectifier 8 is lowered gradually during the time from occurrence of the short-circuit trouble to the blow-out of the fuse 34. Consequently the input voltage V3 to the second DC-DC converter unit 29 can be maintained, and therefore the DC-DC converter 13 of the second unit 29 can perform, during the time from occurrence of the short-circuit trouble of the first DC-DC converter unit to the blow-out of the fuse 34, a normal operation by the discharge current released from the capacitor 33, hence retaining proper power supply to the load 3.

According to the first embodiment described above, one AC-DC converter unit 23 can be used as a common AC-DC conversion means for the plural DC-DC converter units 28 and 29, thereby realizing elimination of the multiple low-voltage capacitors 27 each having a small energy storage capacity per unitary volume and disposed on the load 3 side as in the conventional example of FIG. 12, and consequently the system can be down-sized as a whole.

Figure 2:
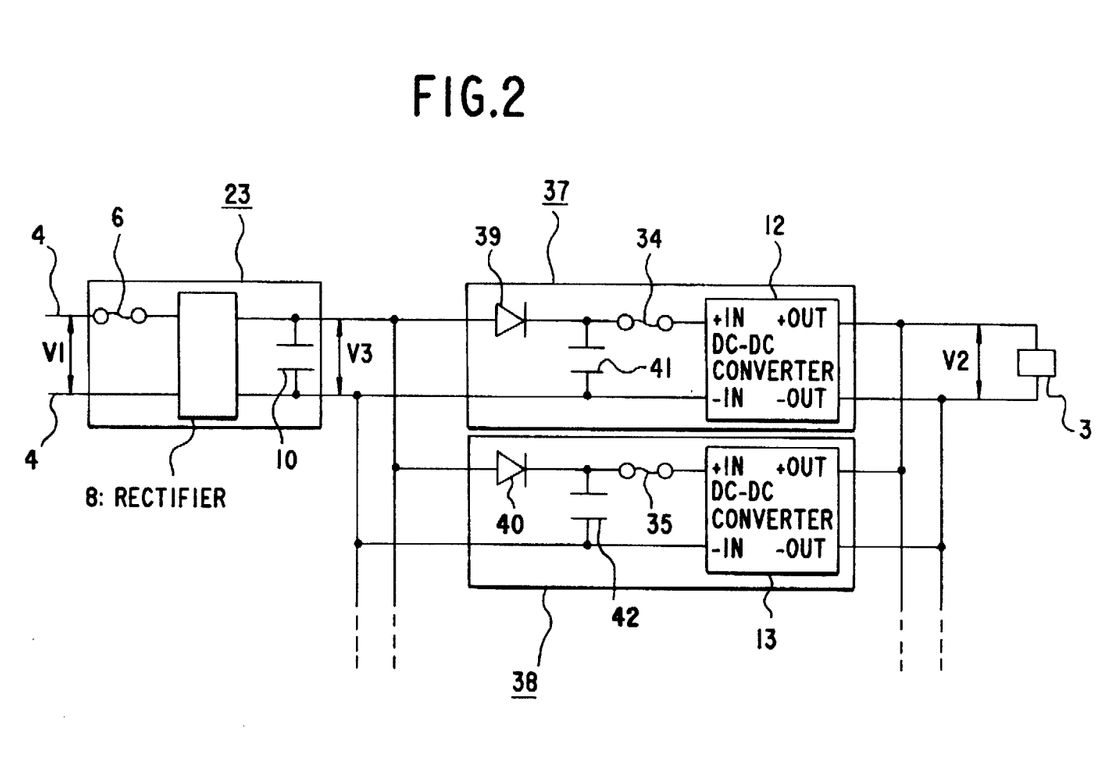
FIG. 2 is a circuit block diagram of a power supply system in a second embodiment of the invention.

Next a power supply system in a second embodiment will be described below with reference to FIG. 2. In this diagram, like system components corresponding to those employed in the foregoing first embodiment of FIG. 1 are denoted by like reference numerals, and a repeated explanation thereof is omitted. The power supply system of the second embodiment shown in FIG. 2 is different from the first embodiment of FIG. 1 in the point that a plurality of DC-DC converter units 37 and 38 connected in parallel to an AC-DC converter unit 23 are formed by connecting diodes 39 and 40 instead of coils 30 and 31. In FIG. 2, a capacitor 41 (or 42) connected between a line, which is interposed between the diode 39 (or 40) and a fuse 34 (or 35), and another line between the output side of a rectifier 8 and the input side of a converter 12, has a capacity Greater than that of the aforementioned capacitor 32 (or 33) shown in FIG. 1.

When the DC-DC converter 12 for example is short-circuited in this construction, the fuse 34 is blown out, and the output voltage V3 of the rectifier 8 is suddenly dropped to be approximately zero volt during the time from occurrence of such short-circuit trouble to the blow-out of the fuse 34. Consequently, in the second DC-DC converter unit 38, the electric charge stored in the capacitor 42 serves to place the diode 40 in its reverse-biased state, whereby the input voltage to the DC-DC converter 13 can be compensated during the time from occurrence of the short-circuit trouble in the first unit 28 to the blow-out of the fuse 34, hence ensuring proper power supply to the load 3. Thus, the effect attained in the first embodiment can be achieved in the above-described second embodiment as well.

Figure 3:
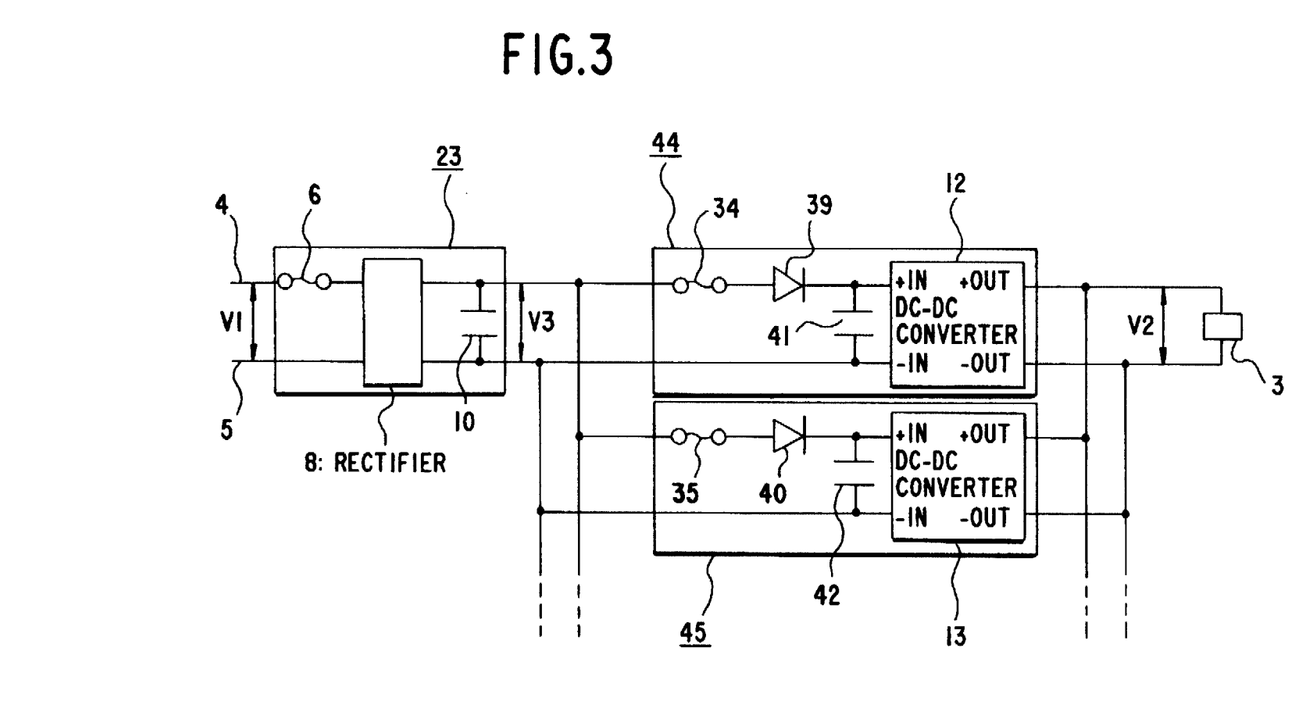
FIG. 3 is a circuit block diagram of a power supply system in a third embodiment of the invention.

Now a power supply system in a third embodiment will be described below with reference to FIG. 3. In this diagram, like system components corresponding to those employed in the second embodiment of FIG. 2 are denoted by like reference numerals, and a repeated explanation thereof is omitted. The power supply system of the third embodiment shown in FIG. 3 is different from the second embodiment of FIG. 2 in the point that the positions of connection of the fuses 34 and 35 in the DC-DC converter units 37 and 38 shown in FIG. 2 are changed to anterior stages of the diodes 39 and 40 in constituting a plurality of DC-DC converter units 44 and 45 shown in FIG. 3. In this construction also, during the time from a short-circuit trouble of the DC-DC converter 12 to blow-out of the fuse 34, the diode 40 is placed in its reverse-biased state by the electric charge stored in the capacitor 42 as in the second embodiment, whereby the input voltage to the DC-DC converter 13 can be compensated to consequently ensure proper power supply to the load 3. Thus, the effect attained in the first embodiment can be achieved in the above-described third embodiment as well.

Figure 4:
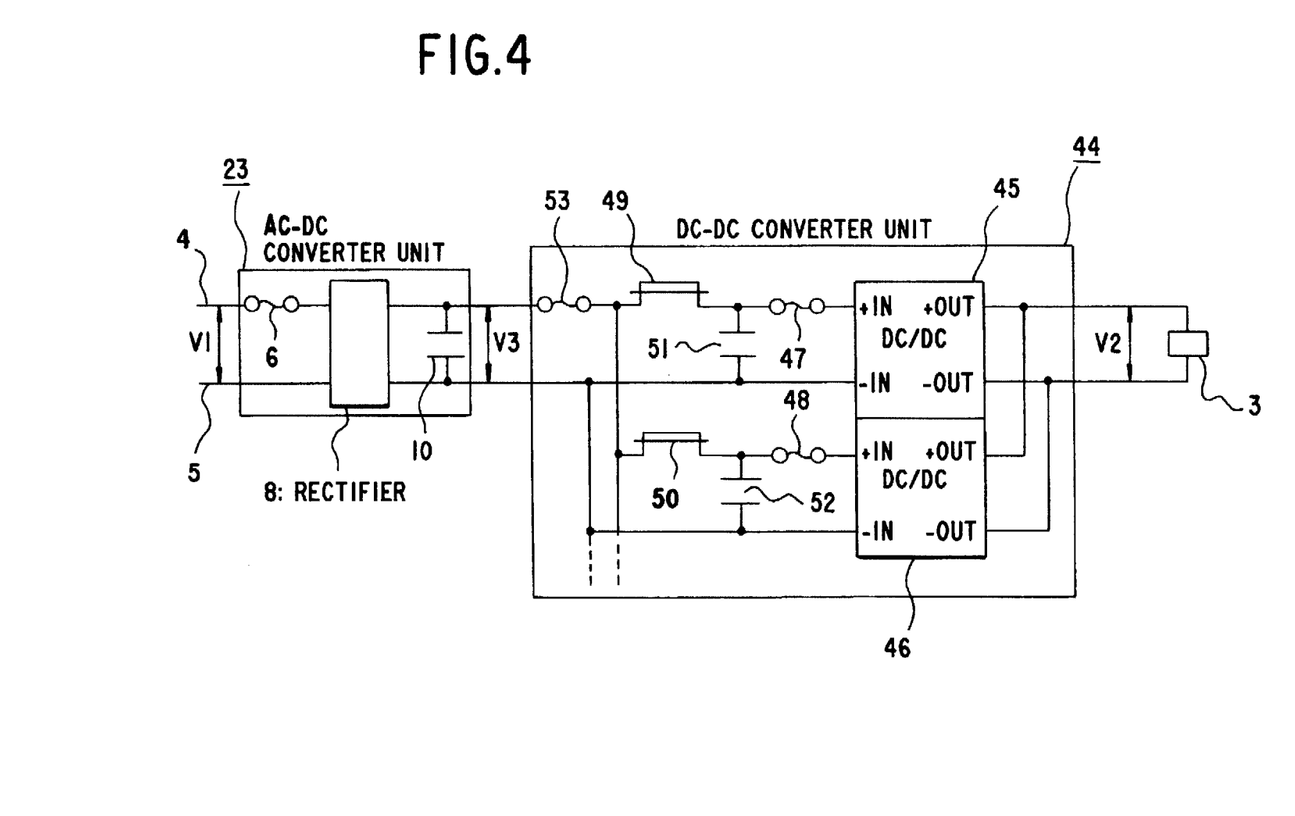
FIG. 4 is a circuit block diagram of a power supply system in a fourth embodiment of the invention.

Next a power supply system in a fourth embodiment will be described with reference to FIG. 4. In this diagram, like system components corresponding to those employed in the first embodiment of FIG. 1 are denoted by like reference numerals, and a repeated explanation thereof is omitted. The power supply system of the fourth embodiment shown in FIG. 4 is characterized in that DC-DC converters incorporated in a DC-DC converter unit 44 are formed into modules as in the aforementioned conventional example of FIG. 11, and coils 49 and 50 are connected, as in the first embodiment of FIG. 1, via fuses 47 and 48 to the input side of DC-DC modules 45 and 46, wherein capacitors 51 and 52 are connected between the fuses 47, 48 and the coils 49, 50 respectively, and the coils 49 and 50 are connected in parallel to the output side of a rectifier 8 via a fuse 53.

The fuse 53 is blown out upon occurrence of a short-circuit trouble between the fuses 47, 48 and the fuse 53, and it has a capacity slightly Greater than that of each of the fuses 47 and 48 connected to the input side of the DC-DC modules 45 and 46. Assuming that the DC-DC converter 12 shown in FIG. 1 has a capacity of 5V/100A for example, such converter is constituted of five DC-DC modules each having a capacity of 5V/20A. In this case, although merely two DC-DC modules are shown in FIG. 4 as denoted by reference numerals 45 and 46, there exist five modules practically.

When the DC-DC module 45 for example is short-circuited in this construction, the fuse 47 is blown out by the discharge current from the capacitor 51, but the output voltage V3 of the rectifier 8 is gradually lowered due to the existence of the coil 49 during the time from occurrence of such short-circuit trouble to the blow-out of the fuse 47, whereby the input voltage to the other DC-DC module 46 can be maintained. Consequently, the other DC-DC module 46 performs a normal operation by the discharge current from the capacitor 52 during the time from occurrence of the short-circuit trouble to the blowout of the fuse 47, hence ensuring proper power supply to the load 3.

If a plurality of the above-described DC-DC converter units 44 in the fourth embodiment are connected in parallel to the AC-DC converter unit 23, it becomes possible to constitute a power supply system of a redundant construction which is capable of performing efficient power supply to the load 3 despite occurrence of any fault. This effect will now be explained below.

Figure 5:
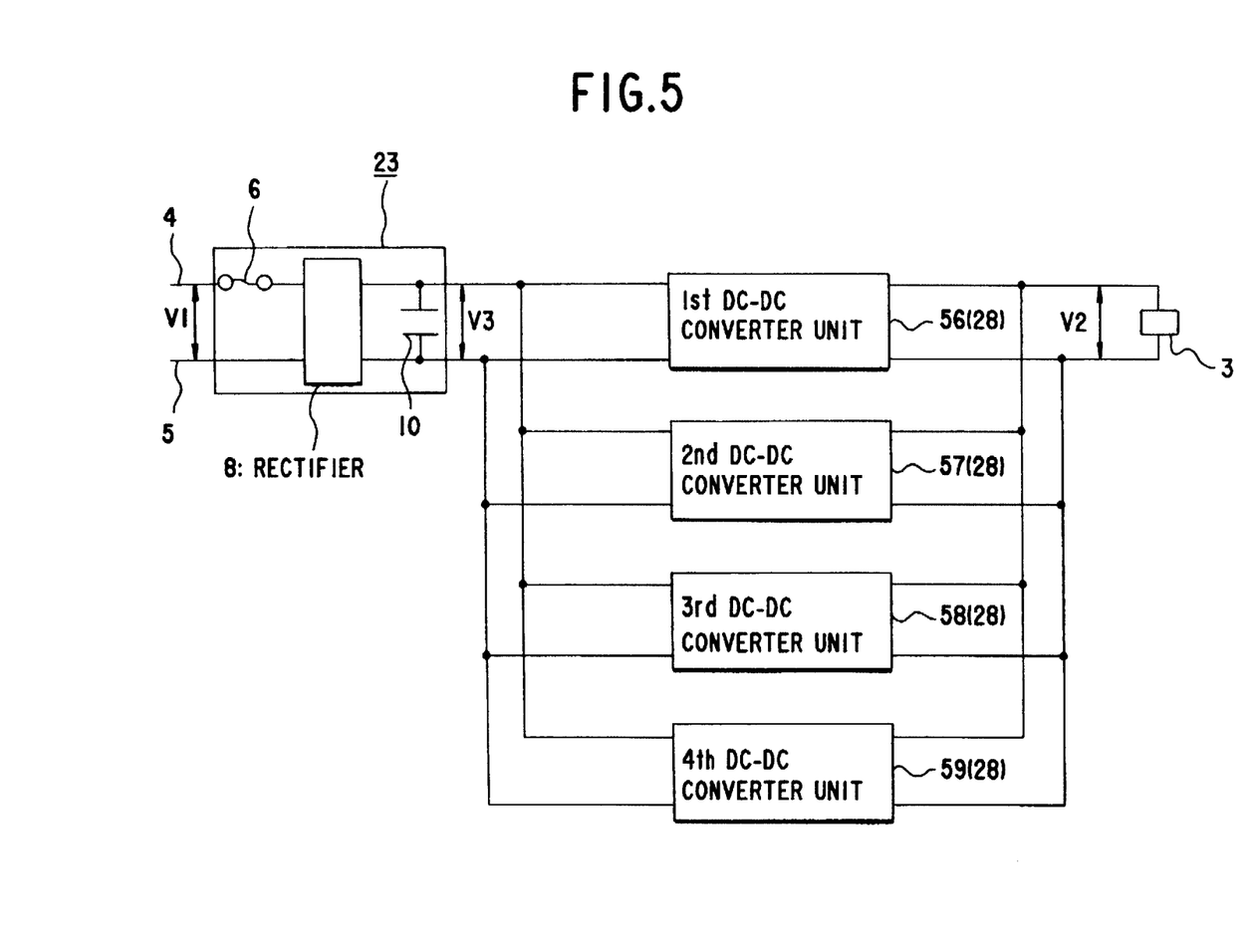
FIG. 5 is a circuit block diagram of a power supply system using four of the DC-DC converter unit shown in FIG. 1.

First, four of the DC-DC converter unit 28 (or 29) shown in FIG. 1 are employed as denoted by reference numerals 56, 57, 58 and 59 in FIG. 5, and are connected in parallel to the AC-DC converter unit 23 to constitute a power supply system of a redundant construction which can perform relief power supply to the load 3. Assuming now that the load 3 requires a load current of 270A for example and each of the DC-DC converter units 56–59 has a capacity of 5V/100A, normally the requirement can be satisfied by using the three DC-DC converter units 56–58. However, considering a relief needed upon occurrence of a fault in the DC-DC converter, it is necessary to form a redundant construction which includes another additional converter unit as shown in FIG. 5.

Such a construction, however, is somewhat wasteful since a maximum of 400A can be supplied in a normal state as compared with the required load current of 270A, whereby the production cost is raised. The wasteful power supply can be eliminated in a modified construction which employs a plurality of the DC-DC converter units 44 shown in FIG. 4. In the above exemplary case where the load current is 270A and each DC-DC converter unit has a capacity of 5V/100A, the requirement can be met by the use of three DC-DC converter units 44 denoted by reference numerals 61, 62 and 63 in FIG. 6.

Figure 6:
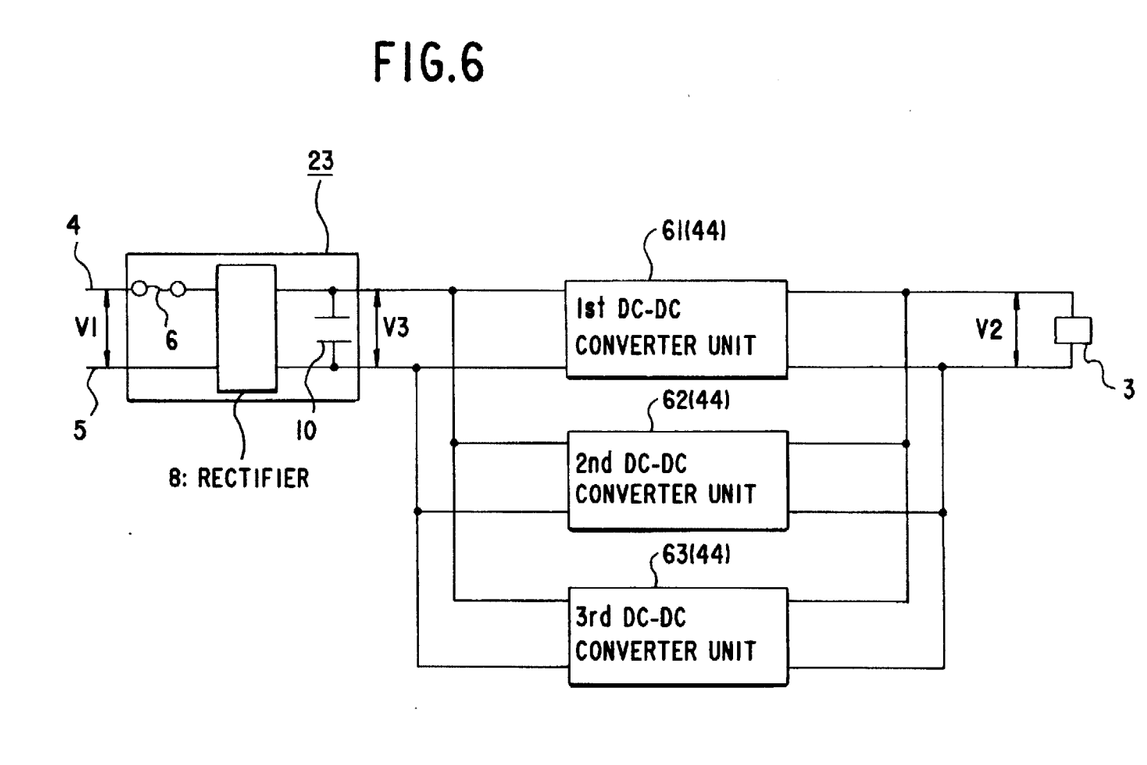
FIG. 6 is a circuit block diagram of a power supply system using three of the DC-DC converter unit shown in FIG. 4.

Normally the necessary power supply to the load 3 can be executed by the three DC-DC converters 61–63. Since each of the DC-DC converters 61–63 consists of five DC-DC modules each having a capacity of 5V/20A, a total of fifteen DC-DC modules are used. Therefore, if one of such modules is short-circuited, the remaining fourteen modules are capable of supplying 14×20A=280A, hence realizing a relief upon occurrence of a fault. Thus, according to the fourth embodiment, it is possible to constitute a power supply system of a redundant construction at low cost.

Figure 7:
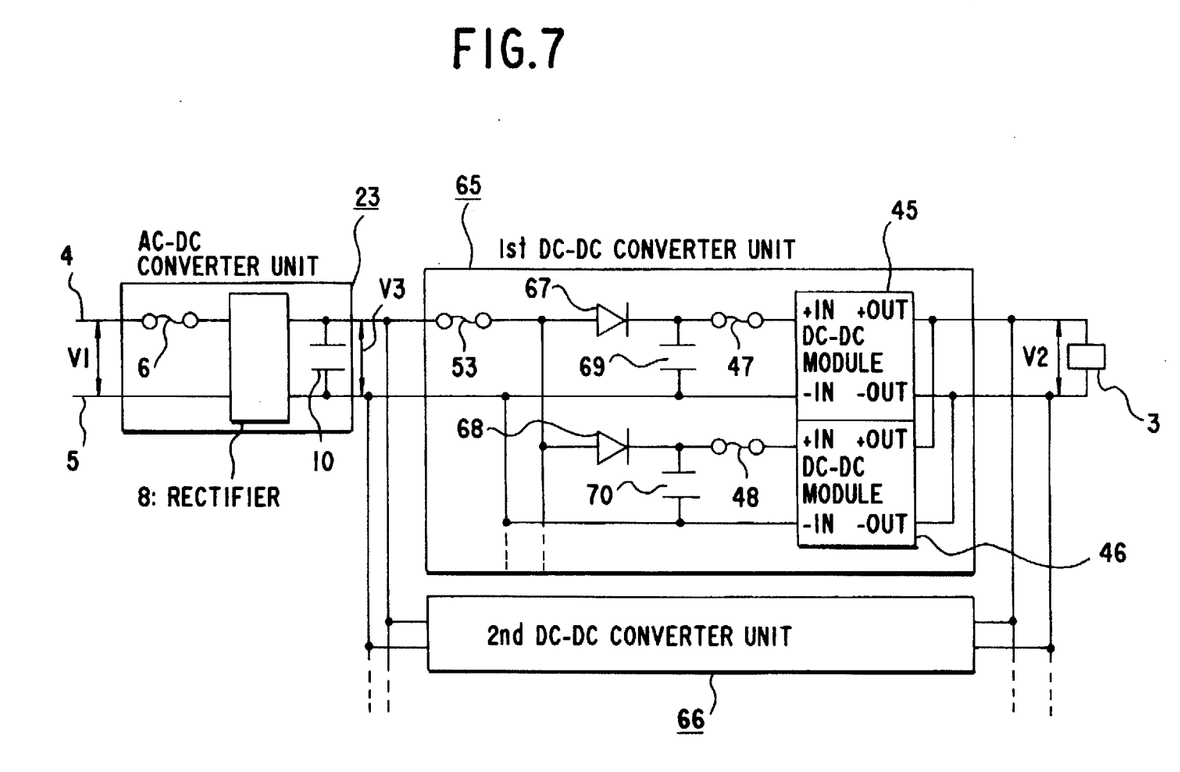
FIG. 7 is a circuit block diagram of a power supply system in a fifth embodiment of the invention.

Next, a power supply system in a fifth embodiment will be described below with reference to FIG. 7. In this diagram, like system components corresponding to those used in the fourth embodiment of FIG. 4 are denoted by like reference numerals, and a repeated explanation thereof is omitted. The fifth embodiment shown in FIG. 7 is characterized in the construction where DC-DC converter units 65 and 66 connected in parallel to an AC-DC converter unit 23 are so constituted that, as illustrated in the unit 65 taken as a representative example, diodes 67 and 68 are connected via fuses 47 and 48 to the input side of DC-DC modules 45 and 46, and capacitors 69 and 70 are connected between the fuses 47, 48 and the diodes 67, 68 respectively, wherein the diodes 67 and 68 are connected in parallel to the output side of a rectifier 8 via a fuse 53.

When the DC-DC module 45 for example is short-circuited in the above construction, the fuse 47 is blown out, and the output voltage V3 of the rectifier 8 is suddenly dropped to be approximately zero volt during the time from occurrence of the short-circuit trouble to the blow-out of the fuse 47. Consequently the diode 68 is placed in its reverse-biased state by the electric charge stored in the capacitor 70, whereby the input voltage to the DC-DC module 46 is compensated to eventually maintain the proper power supply to the load 3. In the above-described fifth embodiment also, the effect attained in the fourth embodiment can be achieved as well.

Figure 8:
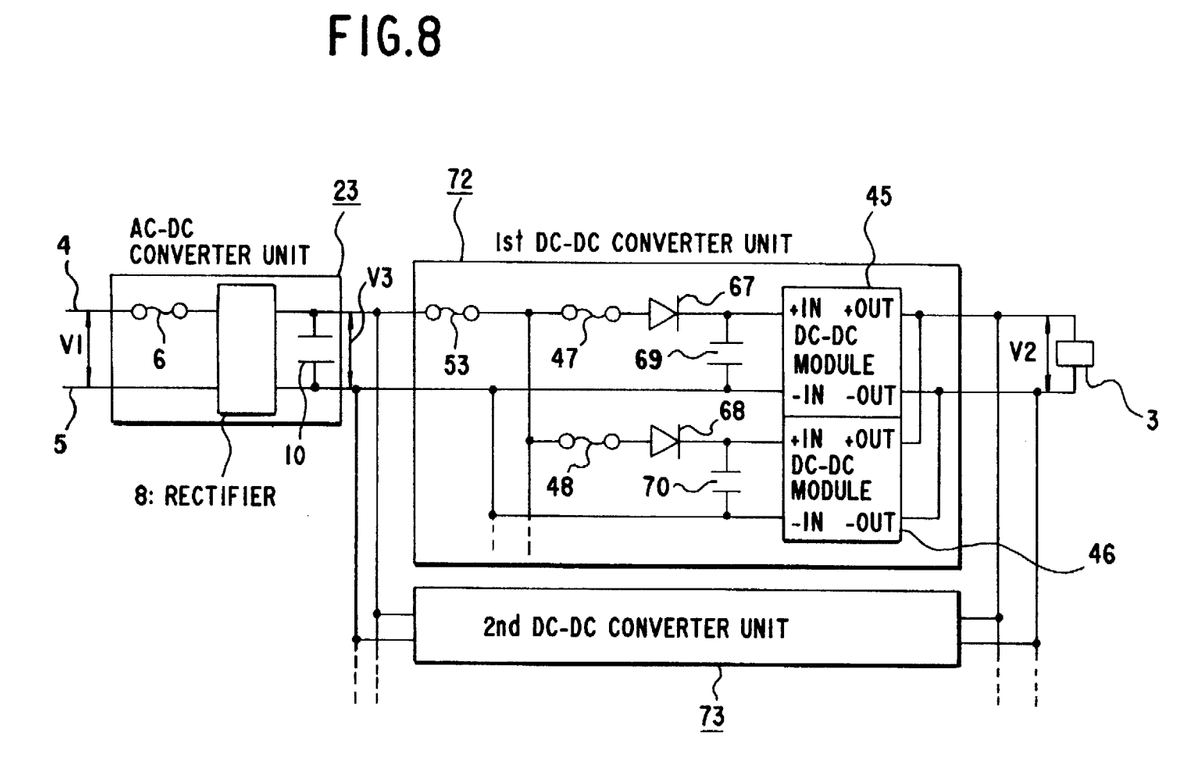
FIG. 8 is a circuit block diagram of a power supply system in a sixth embodiment of the invention.

Finally, a power supply system in a sixth embodiment will be described with reference to FIG. 8. In this diagram, like system components corresponding to those used in the foregoing fifth embodiment of FIG. 7 are denoted by like reference numerals, and a repeated explanation thereof is omitted. The feature of the sixth embodiment shown in FIG. 8 resides in the construction where the positions of connection of the fuses 47 and 48 shown in FIG. 7 are changed to anterior stages of the diodes 67 and 68. In this construction also, during the time from occurrence of a short-circuit trouble in the DC-DC module 45 to blow-out of the fuse 47, the diode 68 is placed, similarly to the fifth embodiment, in its reverse-biased state by the electric charge stored in the capacitor 70, so that the input voltage to the DC-DC module 46 can be compensated to consequently maintain the proper power supply to the load 3. In this sixth embodiment also, the effect attained in the fourth embodiment can be achieved as well.

According to the present invention, as described hereinabove, it is possible to accomplish advantageous effect of manufacturing a down-sized low-cost power supply system of a redundant construction where, upon occurrence of a fault in any one power unit, the other power unit can perform relief power supply to a load.

What is claimed is:

1. A power supply system for feeding a load with a DC output, comprising:

an AC-DC converter for converting an AC voltage to a DC voltage, said AC-DC converter including a rectifier for rectifying the AC voltage and a first capacitor for smoothing a rectified output from said rectifier; and a plurality of power units connected in parallel to an output side of said AC-DC converter;

wherein each of said power units includes a power source for feeding said load with a stable DC output corresponding to said DC voltage, an interruption means connected to an input side of said power source for cutting off a first input line, a coil connected in series to said interruption means and a second capacitor connected between the first input line and a second input line, said second capacitor being disposed between said interruption means and said coil, said second input line being connected between the output side of said AC-DC converter and the input side of said power source, said coil being inserted in the first input line between said first capacitor of said AC-DC converter and said interruption means.

2. A power supply system for feeding a load with a DC output, comprising:

an AC-DC converter for converting an AC voltage to a DC voltage; and a plurality of power units connected in parallel to an output side of said AC-DC converter;

wherein each of said power units includes a power source for feeding said load with a stable DC output corresponding to said DC voltage, a cutoff means connected to an input side of said power source for cutting off a first input line, a diode connected in series to said cutoff means with an anode of said diode connected to said AC-DC converter and a cathode of said diode connected to said cutoff means, and a capacitor connected between the first input line and a second input line, said capacitor disposed between said cut-off means and said diode, said diode being connected between said capacitor and a branching point to said other power units, said second input line being connected between the output side of said AC-DC converter and the input side of said power source.

3. A power supply system for feeding a load with a DC output, comprising:

an AC-DC converter for converting an AC voltage to a DC voltage; and a plurality of power units connected in parallel to an output side of said AC-DC converter;

wherein each of said power units includes a power source for feeding said load with a stable DC output corresponding to said DC voltage, a diode connected to an input side of said power source, a cutoff means connected in series to said diode for cutting off a first input line, and a capacitor connected between the first input line and a second input line, said capacitor disposed between the input side of said power source and said diode, said diode being connected between said capacitor and a branching point to said other power units, said second input line being connected between the output side of said AC-DC converter and the input side of said power source, and said diode being connected such that a cathode thereof is on the input side of said power source.

4. The power supply system according to claim 1, wherein said power source consists of a DC-DC converter for stably outputting the DC voltage inputted thereto.

5. A power supply system for feeding a load with a DC output, comprising:

an AC-DC converter for converting an AC voltage to a DC voltage, said AC-DC converter including a rectifier for rectifying the AC voltage and a first capacitor for smoothing a rectified output from said rectifier; and a power unit connected to said AC-DC converter via a power line and a ground line;

wherein said power unit includes a plurality of power circuits connected in parallel to said AC-DC converter, and wherein each of said power circuits includes a unitary power source for feeding said load with a stable output corresponding to said DC voltage, a first interruption means connected to an input side of said unitary power source for cutting off said power line, a coil connected to series to said first interruption means, and a second capacitor connected between the power line and the ground line, said second capacitor disposed between said first interruption means and said coil, said ground line being disposed between an output side of said AC-DC converter and an input side of said unitary power source, said coil being inserted in the power line between said first capacitor of said AC-DC converter and said first interruption means.

6. The power supply system according to claim 5, wherein a plurality of said power units are connected in parallel to said AC-DC converter.

7. A power supply system according to claim 5, wherein said power unit further includes a second interruption means inserted in said power line between said AC-DC converter and said coil.

8. A power supply system for feeding a load with a DC output, comprising:

an AC-DC converter for converting an AC voltage to a DC voltage; and a power unit connected to said AC-DC converter via a power line and a ground line;

wherein said power unit includes a plurality of power circuits connected in parallel to said AC-DC converter, and wherein each of said power circuits includes a unitary power source for feeding said load with a stable output corresponding to said DC voltage, a first interruption means connected to an input side of said unitary power source for cutting off said power line, a diode connected in series to said first interruption means, and a capacitor connected between said power line and said ground line, said capacitor disposed between said first interruption means and said diode, said diode being connected between said capacitor and a branching point to said other power units, said ground line being connected between an output side of said AC-DC converter and an input side of said unitary power source, said diode being connected such that an anode thereof is on the side of said AC-DC converter while a cathode thereof is on the side of said first interruption means.

9. The power supply system according to claim 8, wherein a plurality of said power units are connected in parallel to said AC-DC converter.

10. A power supply system according to claim 8, wherein said power unit further includes a second interruption means inserted in said power line between said AC-DC converter and said diode.

11. A power supply system for feeding a load with a DC output, comprising:

an AC-DC converter for converting an AC voltage to a DC voltage; and a power unit connected to said AC-DC converter via a power line and a ground line;

wherein said power unit includes a plurality of power circuits connected in parallel to said AC-DC converter, and wherein each of said power circuits includes a unitary power source for feeding said load with a stable output corresponding to said DC voltage, a diode connected to an input side of said unitary power source, a first interruption means connected in series to said diode for cutting off said power line, and a capacitor connected between the power line and the ground line, said capacitor disposed between said diode and the input side of said unitary power source, said diode being connected between said capacitor and a branching point to said other power units, said ground line being connected between an output side of said AC-DC converter and the input side of said unitary power source, said diode being so connected that an anode thereof is on the side of said AC-DC converter while a cathode thereof is on the side of said unitary power source.

12. The power supply system according to claim 11, wherein a plurality of said power units are connected in parallel to said AC-DC converter.

13. A power supply system according to claim 11, wherein said power unit further includes a second interruption means inserted in said power line between said AC-DC converter and said first interruption means.

* * * * *